(12) United States Patent
Mei et al.

(10) Patent No.: US 7,212,381 B2
(45) Date of Patent: May 1, 2007

(54) SLIDER HAVING ADJUSTED TRANSDUCER RECESSION AND METHOD OF ADJUSTING RECESSION

(75) Inventors: Youping Mei, Eden Prairie, MN (US); Jun Mou, Edina, MN (US); Dale E. Egbert, Deephaven, MN (US); Ling Ma, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 550 days.

(21) Appl. No.: 10/641,282

(22) Filed: Aug. 14, 2003

(65) Prior Publication Data

US 2005/0047017 A1    Mar. 3, 2005

(51) Int. Cl.
 *G11B 5/56* (2006.01)
 *G11B 5/60* (2006.01)
(52) U.S. Cl. .................... 360/294.7; 360/234.7
(58) Field of Classification Search ............... None
 See application file for complete search history.

(56) References Cited

U.S. PATENT DOCUMENTS

| | | | |
|---|---|---|---|
| 4,835,361 A | 5/1989 | Strom | 219/121.85 |
| 4,910,621 A | 3/1990 | Matsuda et al. | 360/104 |
| 4,914,868 A | 4/1990 | Church et al. | 51/165.71 |
| 5,266,769 A | 11/1993 | Deshpande et al. | 219/121.69 |
| 5,442,850 A | 8/1995 | Kerth | 29/603 |
| 5,636,088 A | 6/1997 | Yamamoto | 360/245.1 |
| 5,936,806 A | 8/1999 | Pan et al. | 360/104 |
| 5,949,627 A | 9/1999 | Williams et al. | 360/126 |
| 5,953,125 A | 9/1999 | De Groot | 356/357 |
| 6,057,975 A | 5/2000 | Yaeger et al. | 360/75 |
| 6,073,337 A | 6/2000 | Strom | 29/603.12 |
| 6,108,170 A | 8/2000 | Crawforth et al. | 360/234.3 |
| 6,321,440 B1 | 11/2001 | Crawforth et al. | 29/603.1 |
| 6,466,409 B1 | 10/2002 | Baba et al. | 360/236.3 |
| 6,501,048 B1 | 12/2002 | Strom | 219/121.85 |
| 6,531,084 B1 | 3/2003 | Strom et al. | 264/400 |
| 6,963,464 B2 * | 11/2005 | Xu et al. | 360/294.7 |
| 6,992,865 B2 * | 1/2006 | Thurn et al. | 360/294.7 |

OTHER PUBLICATIONS

Youping Mei, "Lapping Control of Hard Disk Drive Heads", Thesis submited to the University of Minnesota, Apr. 1999, pp. 1-177.
Bekir S. Yibas, et al., "Laser-Induced Thermal Stresses on Steel Surface", Optics and Lasers in Engineering 30 (1998), Dept. of Mech. Eng., King Fahd Univ. of Petroleum and Minerals, Dhahran 31261, Saudi Arabia, pp. 25-37.

(Continued)

*Primary Examiner*—Robert S. Tupper
(74) *Attorney, Agent, or Firm*—Westman, Champlin & Kelly

(57) ABSTRACT

A method and apparatus are provided for adjusting recession of an element, such as a pole tip, in a transducer structure formed in a plurality of thin film layers on an edge of a slider. A pre-stressed structure is formed as part of the plurality of thin film layers on the edge of the slider. The pre-stressed structure has a level of material stress. The recession is measured relative to a bearing surface of the slider, and then the level of material stress is adjusted as a function of the measured to effect a corresponding change in the recession.

19 Claims, 6 Drawing Sheets

OTHER PUBLICATIONS

Janez Grum et al., "Influence of Laser Surface Melt-Hardening Conditions on Residual Stresses in Thin Plates", Surface & Coatings Tech., vol. 100-101, Mar. 1998, Elsevier Science S.A., pp. 455-458.

A. Solina, "Residual Stresses Induced By Localized Laser Hardening Treaments On Steels and Cast Iron", Journal of Heat Treating, vol. 4, No. 3, Jun. 1986, pp. 272-280.

* cited by examiner

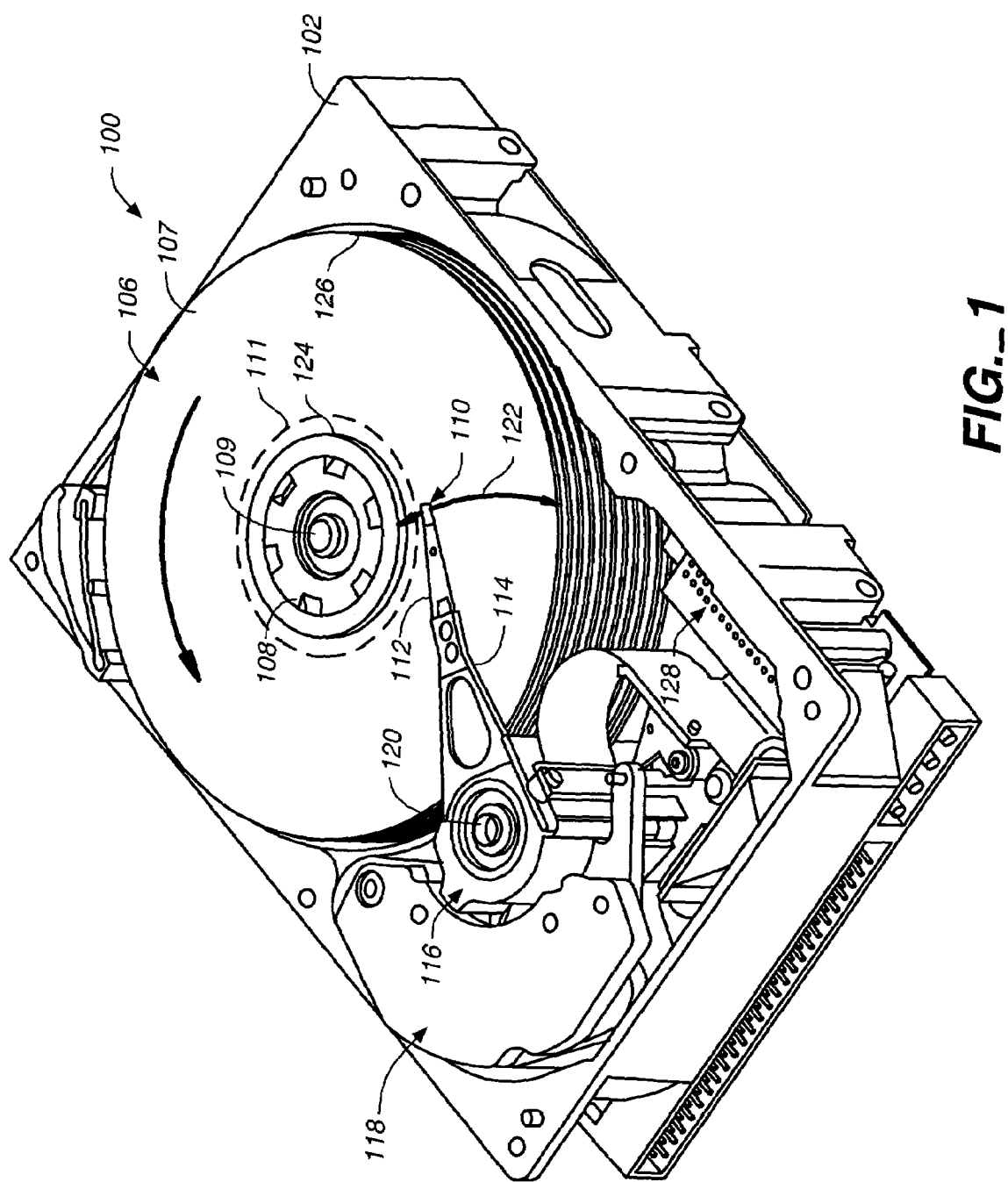
FIG._1

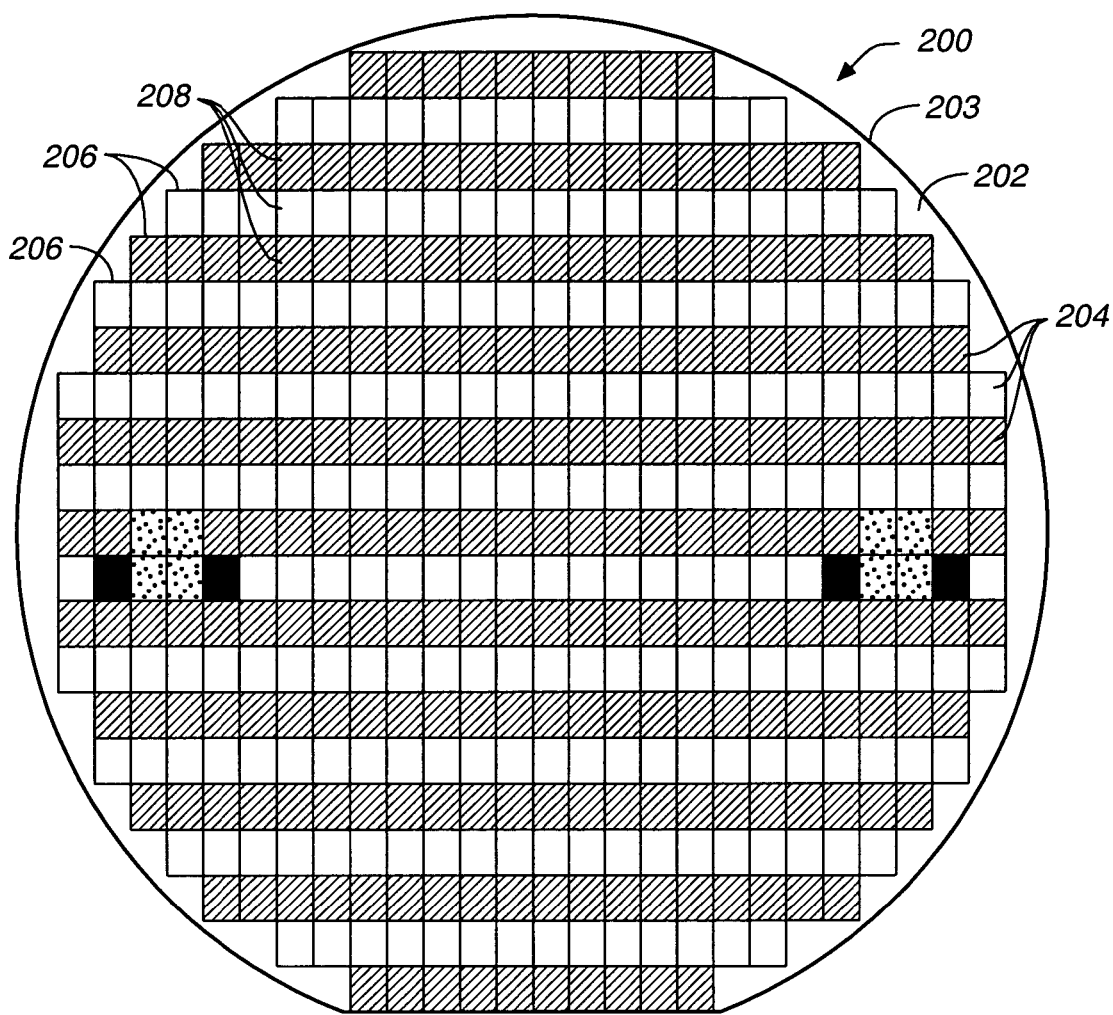
FIG._2
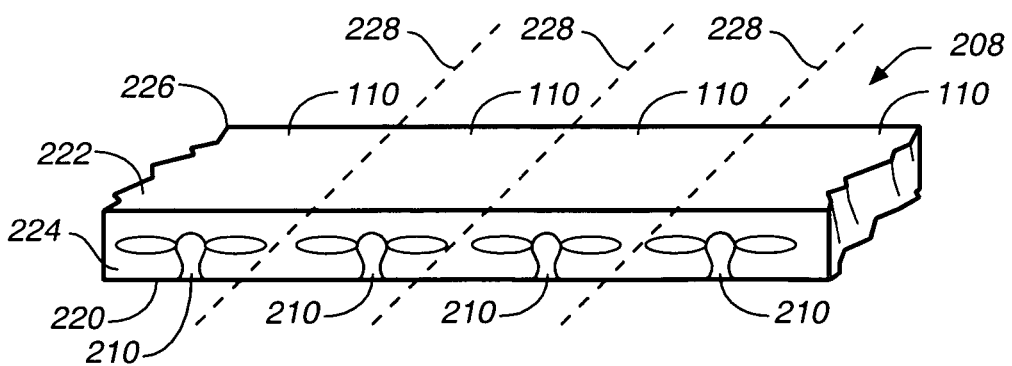
FIG._3

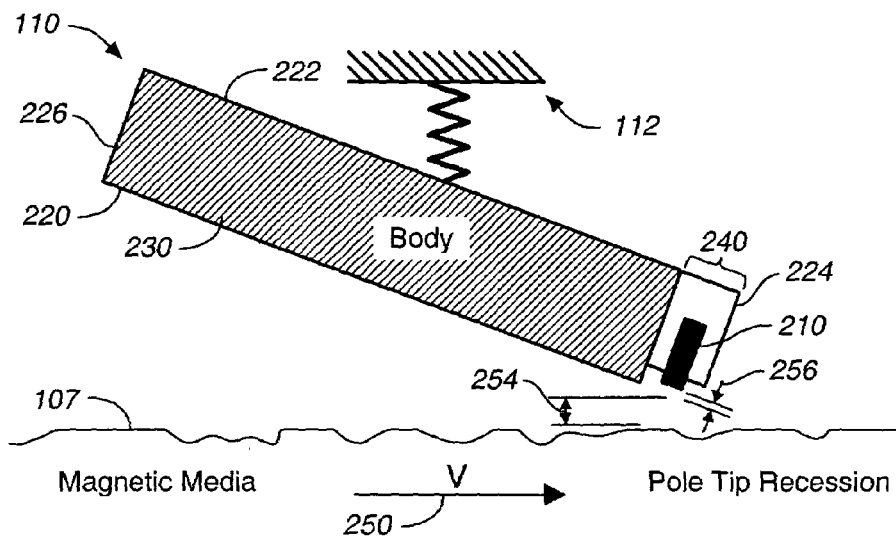
FIG._4
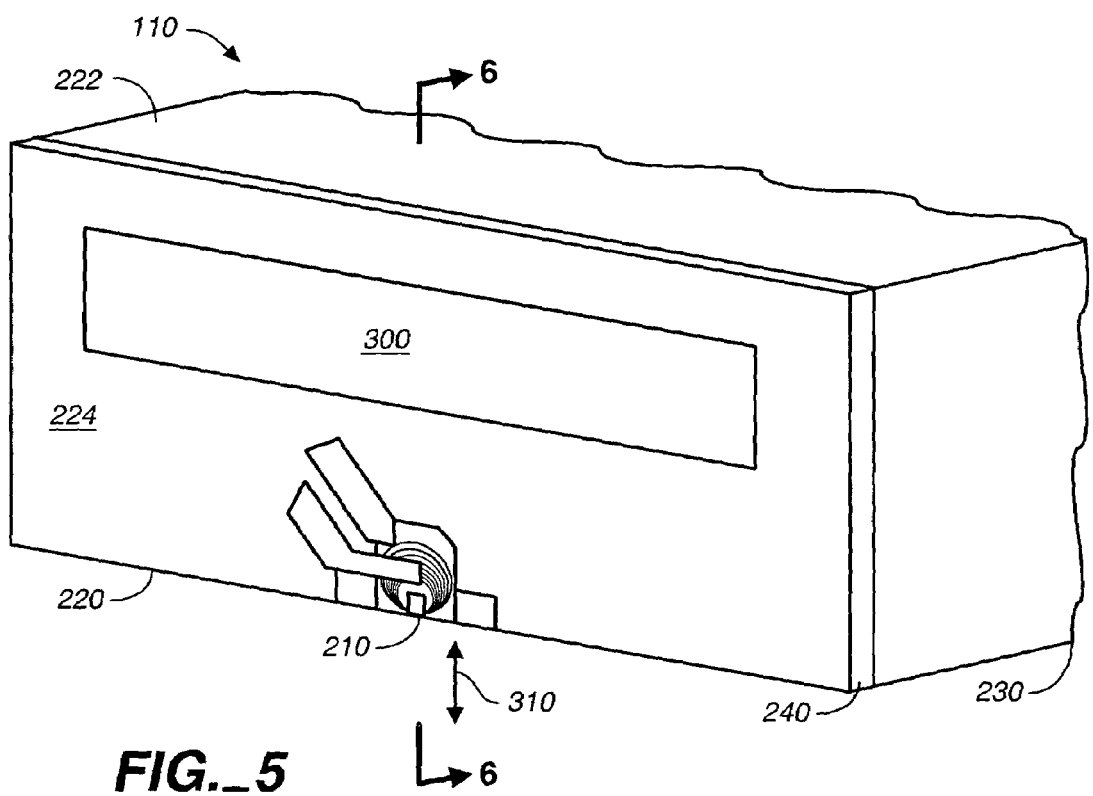
FIG._5

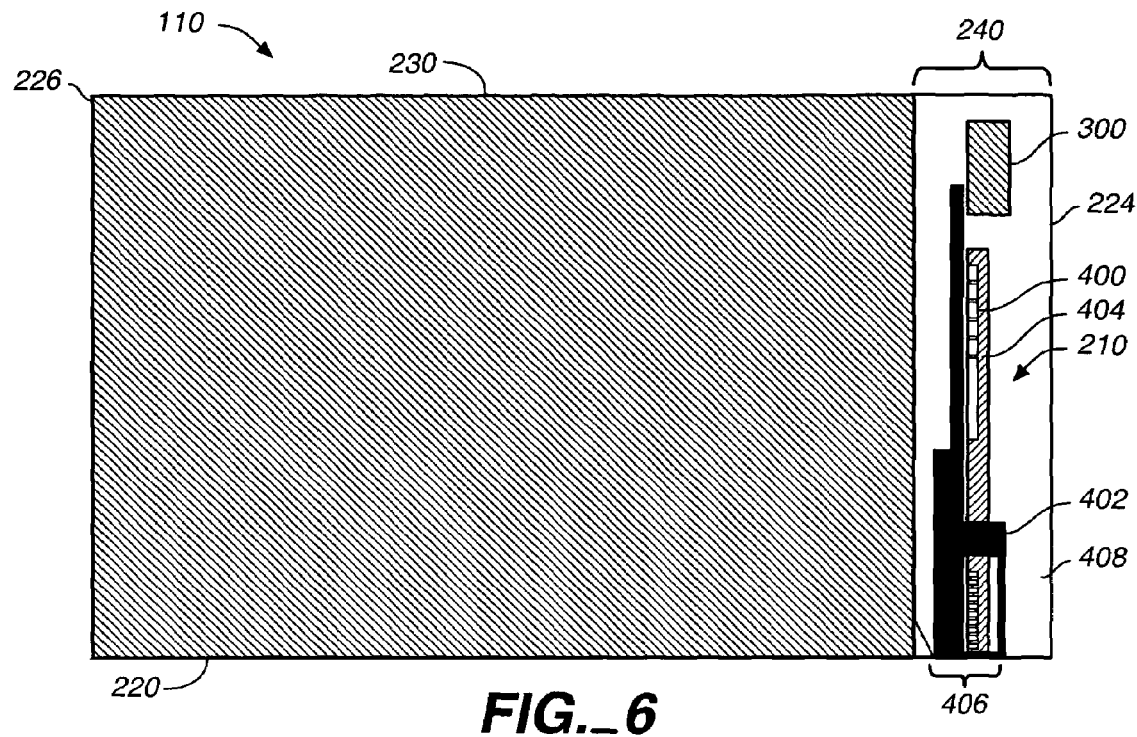
FIG._6
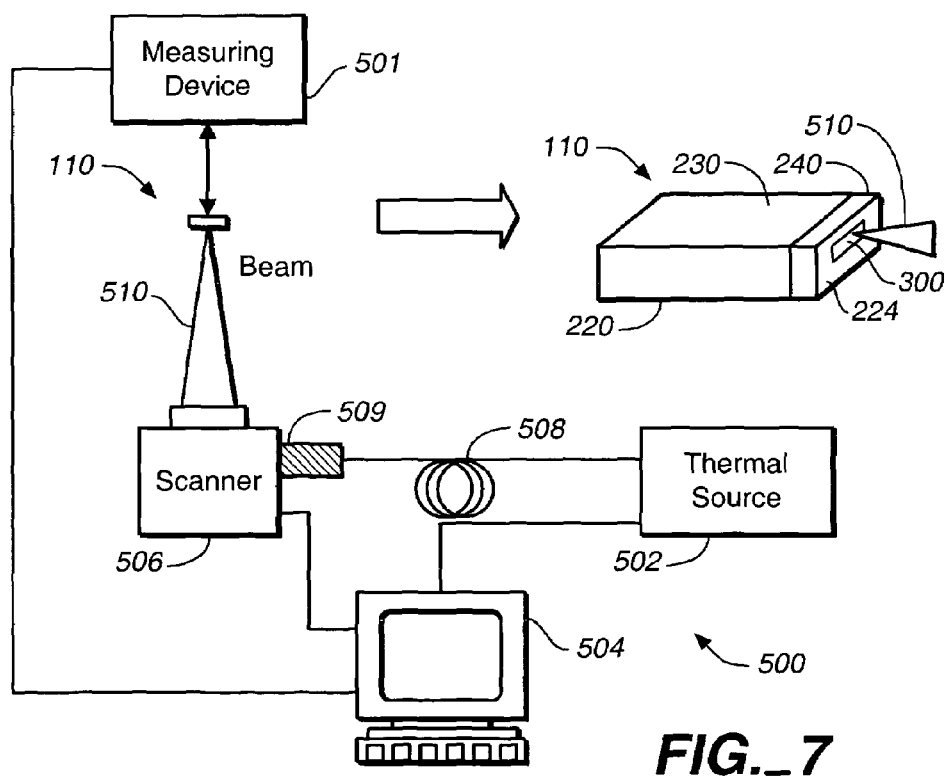
FIG._7

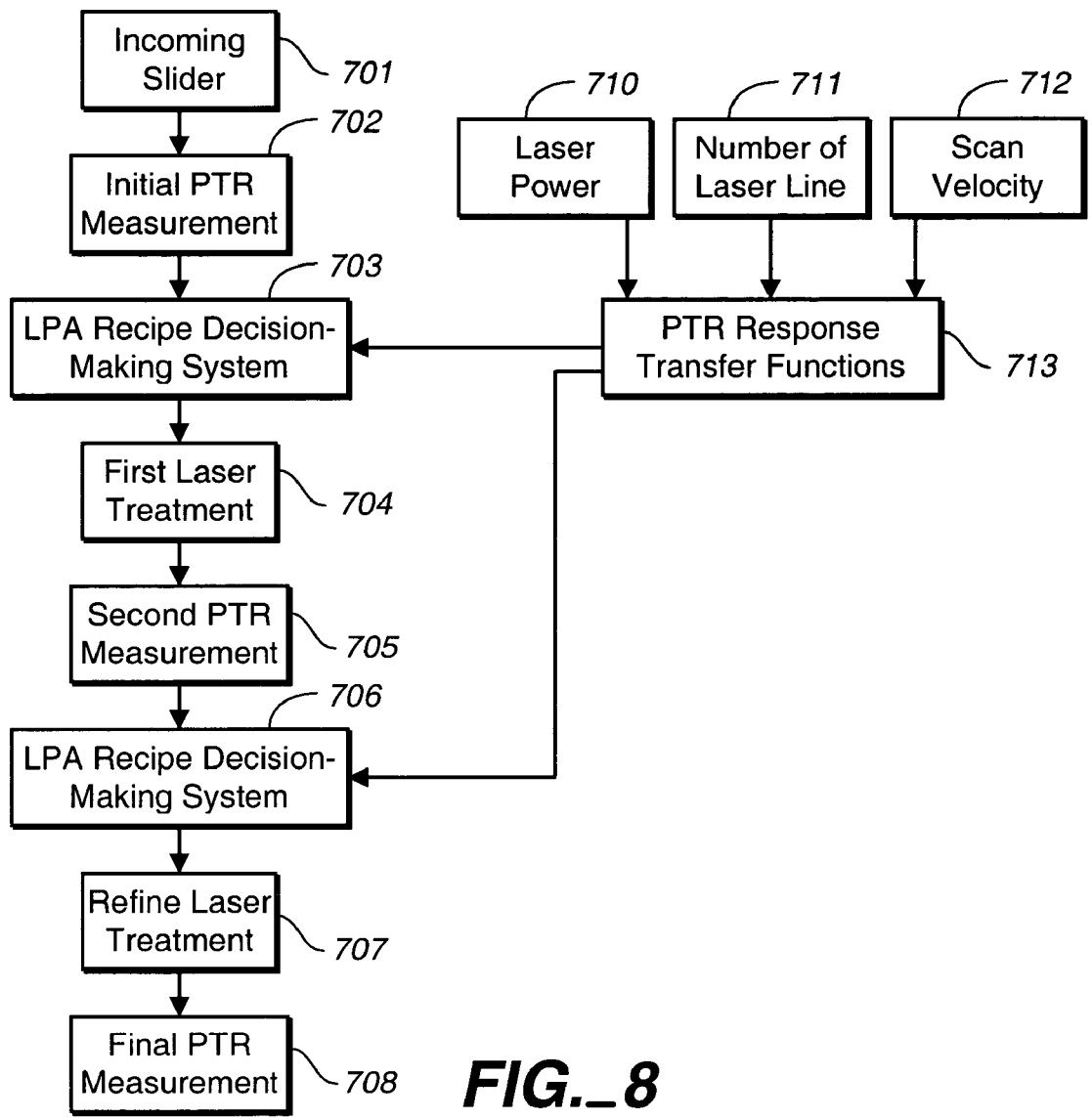
FIG._8

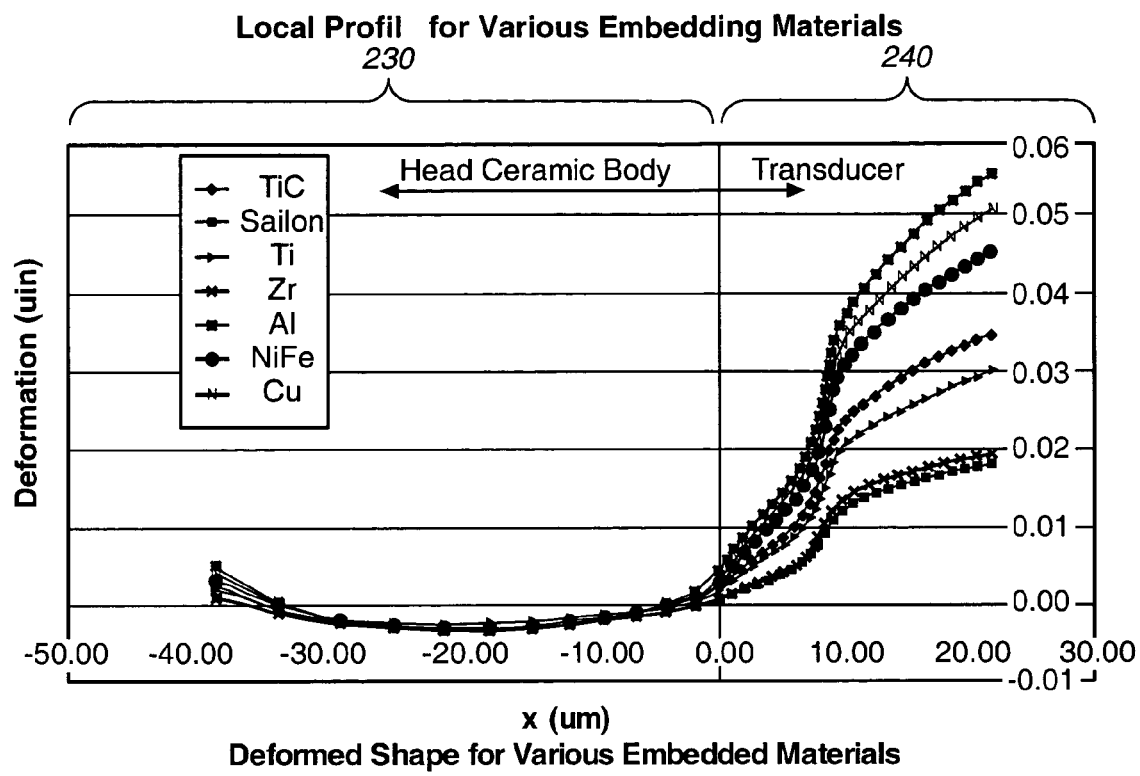
FIG._9
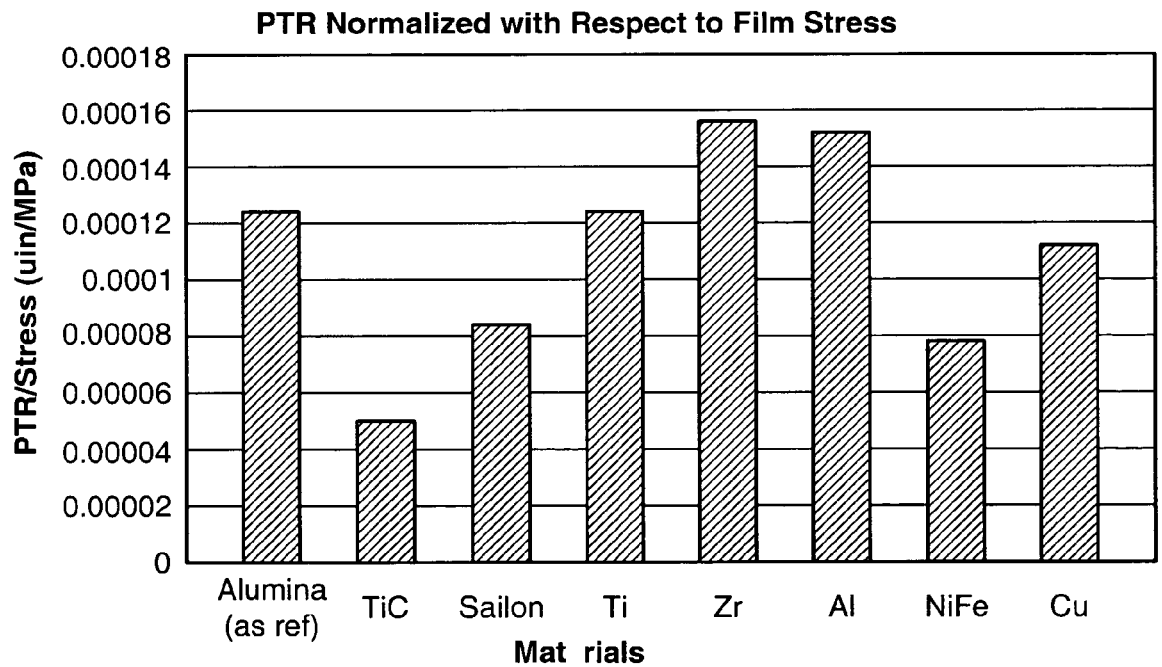
Numerical Testing: Summary of Normalized PTR Adjustment due to Simulated Laser Scribing
FIG._10

SLIDER HAVING ADJUSTED TRANSDUCER RECESSION AND METHOD OF ADJUSTING RECESSION

FIELD OF THE INVENTION

The present invention relates to data storage systems and, more particularly, to a slider and a method of fabricating a slider having a bearing surface and a transducer structure with an element, such as a pole tip, which has a desired recession relative to the bearing surface.

BACKGROUND OF THE INVENTION

Data storage systems use magnetic or other media for storage of digital information. For example, typical disc drives use rigid or flexible discs coated with a magnetizable medium for storing information in a plurality of circular, concentric data tracks. The discs are mounted on a spindle motor, which causes the discs to spin and the surfaces of the discs to pass under respective hydrodynamic (e.g., air) bearing disc head sliders. The sliders carry transducers, which write information to and/or read information from the disc surface. An actuator mechanism moves the sliders from track to track across the surfaces of the discs under control of electronic circuitry. The actuator mechanism includes a suspension for each slider. The suspension includes a load beam and a gimbal. The load beam provides a load force, which forces the slider toward the disc surface. The gimbal is positioned between the slider and the load beam, or is integrated in the load beam, to provide a resilient connection that allows the slider to pitch and roll while following the topography of the disc.

The slider includes a slider body having a bearing surface, such as an air bearing surface, which faces the disc surface. As the disc rotates, the air pressure between the disc and the air bearing surface increases and creates a hydrodynamic lifting force, which causes the slider to lift and fly above the disc surface. The preload force supplied by the load beam counteracts the hydrodynamic lifting force. The preload force and the hydrodynamic lifting force reach an equilibrium, which determines the flying height of the slider relative to the disc surface.

In some applications, the slider flies in close proximity to the surface of the disc. This type of slider is known as a "pseudo-contact" slider, since the bearing surface of the slider can occasionally contact the surface roughness of the disc. In other applications, the slider is designed to remain in direct contact with the disc surface with substantially no air bearing. These sliders are referred to as "contact recording" sliders. The transducer is typically mounted at or near the trailing edge of the slider so that it is located near the closest point on the slider body to the media.

A thin film type of transducer is a microstructure that is designed to perform certain electric, electromagnetic or optical functions during reading and/or writing. Thin film transducers are typically fabricated in an array on an active surface of a wafer substrate through a series of material deposition, etching and liftoff process steps. The wafer substrate is typically made of a ceramic material. Once the array of transducers has been fabricated, the wafer substrate is divided into a number of individual slider bodies. Each slider is thus composed of a ceramic body and a thin film transducer on one side of the body.

During operation, the distance between the active element of the transducer structure, such as the pole tips in a magnetic write transducer, and the media is known as the "head-media spacing". As the recording densities of data storage systems continue to increase, it is important to maintain a substantially constant head-media spacing during operation and to have tight control over the head-media spacing from one slider to the next during fabrication.

In addition to the flying characteristics of the slider, the head-media spacing depends on the vertical position of the pole tip (or other active element) on the slider body. Two primary factors contribute to the pole tip position. The first is pole tip recession (PTR), in which the vertical position of the pole tip becomes recessed relative to the bearing surface due to the machining and other fabrication processes of the slider and transducer structures. The second is thermal pole tip protrusion (TPTP), which is caused by increases in the environmental temperature of the product and by heat generated by the write current through the transducer during normal operation. Manufacturing variations in pole tip recession therefore contribute to undesirable variations in head-media spacing, which can limit recording density.

The present invention provides a solution to this and other problems and offers other advantages over the prior art.

SUMMARY OF THE INVENTION

One embodiment of the present invention is directed to a method of adjusting recession of an element in a transducer structure, which is formed in a plurality of thin film layers on an edge of a slider. The method includes: (a) forming a pre-stressed structure as part of the plurality of thin film layers on the edge of the slider, which has a level of material stress; (b) measuring the recession relative to a bearing surface of the slider; and (c) adjusting the level of material stress as a function of the recession measured in (b) to effect a corresponding change in the recession.

Another embodiment is directed to a method of adjusting recession of an element in a transducer structure formed in a plurality of thin film layers on an edge of a slider. The method includes: (a) forming a pre-stressed structure as part of the plurality of thin film layers on the edge of the slider, wherein the pre-stressed structure comprises a material having a different thermal coefficient of expansion than an adjacent one of the plurality of thin film layers, which is in contact with the pre-stressed structure, such that the material has a level of material stress; (b) measuring the recession relative to a bearing surface of the slider; and (c) adjusting the level of material stress as a function of the recession measured in (b) to effect a corresponding change in the recession.

Another embodiment is directed to a slider, which includes a slider body, a transducer structure and a position adjustment structure. The slider body has a bearing surface, a back surface, which is opposite to the bearing surface and an edge, which extends between the bearing surface and the back surface. The transducer structure is formed in a plurality of thin film layers on the edge of the slider and has an element with a vertical position relative to the bearing surface. The position adjustment structure is formed as part of the plurality of thin film layers and includes a material having a different thermal coefficient of expansion than an adjacent one of the plurality of thin film layers, which is in contact with the position adjustment structure, such that the material has a level of material stress. The position adjustment structure has a material stress adjustment pattern that is a function of the vertical position.

BRIEF DESCRIPTION OF THE DRAWINGS

FIG. 1 is a perspective view of a disc drive with which one embodiment of the present invention is useful.

FIG. 2 is a perspective view of a typical wafer for fabricating a plurality of slider bodies.

FIG. 3 is fragmentary, perspective view of a bar of slider bodies sliced from the wafer shown in FIG. 2.

FIG. 4 schematically illustrates pole tip recession and head-media spacing for one of the sliders relative to a bearing surface on the slider.

FIG. 5 is a fragmentary, trailing end view of the slider, which illustrates the addition of a pre-stressed structure along a trailing surface of the slider, according to one embodiment of the present invention.

FIG. 6 is a cross-sectional view of the slider taken along lines 6—6 of FIG. 5.

FIG. 7 is a diagram of an apparatus for adjusting the recession of the pole tip (or other active element) of a transducer toward a desired vertical position, according to one embodiment of the present invention.

FIG. 8 is a flow chart illustrating a sequence of steps for adjusting recession of the pole tip (or other active element) of the transducer according to one embodiment of the present invention.

FIG. 9 is a graph illustrating the deformed shapes along the bearing surface of the slider for various materials used for the pre-stressed structure following a simulated laser heat treatment.

FIG. 10 is a chart illustrating normalized pole tip recession response due to the simulated laser heat treatment for the various materials shown in FIG. 9.

DETAILED DESCRIPTION OF ILLUSTRATIVE EMBODIMENTS

FIG. 1 is a perspective view of a disc drive 100 with which one embodiment of the present invention is useful. Disc drive 100 can be configured as a traditional magnetic disc drive, a magneto-optical disc drive or an optical disc drive, for example. The present invention is also useful in other types of systems in which a transducer is supported by a substrate relative to a medium with which the transducer communicates.

Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which is mounted to disc drive 100 and carries a read and/or write transducer for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air (or other fluid) under the respective sliders 110 and along their bearing surfaces in a direction approximately parallel to the tangential velocity of the discs. As the air (or other fluid) passes beneath the bearing surfaces, fluid compression along the flow path causes the fluid pressure between the discs and the bearing surfaces to increase, which creates a hydrodynamic lifting force that counteracts the load force provided by suspensions 112 and causes the sliders 110 to lift and fly above or in close proximity to the disc surfaces.

Sliders 110 are formed from a substrate, known as a wafer. FIG. 2 is a perspective view of a typical wafer 200. Wafer 200 can include ceramic, aluminum oxide titanium carbide, aluminum silicon magnesium or silicon, for example. Other materials can also be used. Wafer 200 has an active surface 202 on which a matrix of transducers 204 (shown schematically) are fabricated through a series of thin film material deposition, etching and liftoff process steps. Wafer 200 is then sliced along lines 206 into a plurality of bars 208. Each bar 208 includes a plurality of individual slider bodies, with each body having a corresponding transducer structure.

FIG. 3 is fragmentary, perspective view of a bar 208 of slider bodies sliced from wafer 200. Each bar 208 includes a plurality of individual slider bodies 110, with each slider body 110 having a corresponding transducer 210. For each slider body 110, the sliced surfaces of wafer 200 become a bearing surface 220 and a back surface 222. The active surface 202 and the back surface 203 of wafer 200 become a trailing surface 224 and a leading surface 226, respectively, of the slider body.

Once wafer 200 has been sliced into individual bars 208, the bar is lapped to obtain a target throat height for each transducer (in the case of a magnetic type of transducer) or target resistance (in the case of a magneto-resistive type of transducer). The lapping process is also typically controlled so that the lower end or tip (such as the pole tip in a magnetic transducer) of each transducer 210 has a desired vertical position relative to a reference on the slider body, such as bearing surface 200.

The bearing features are then formed into the bearing surface 220 of each slider body 110, and each bar 208 is diced along a plurality of dice lanes 228 into a plurality individual slider bodies 110. Alternatively, the bearing features can be formed on a slider level, after bars 208 have been diced into individual slider bodies.

Following the formation of each slider body, the lower tip of the transducer is typically recessed from the bearing surface. This recession is typically referred to as "pole tip recession". While a variety of different types of transducers can be used, the term "pole tip recession" is used herein to refer to recession of the lower tip of the transducer or other active element, even if the transducer does not have a magnetic "pole".

FIG. 4 schematically illustrates pole tip recession on one of the sliders 110. Following fabrication, as discussed above with reference to FIGS. 2 and 3, slider 110 includes a slider body or substrate 230 and a plurality of thin film layers 240 in which transducer 210 is fabricated. The slider 110 is then mounted to a suspension 112, which supports the slider over the surface of disc 107.

As disc 107 rotates, the surface of the disc has a tangential velocity 250 relative to slider 110. Slider 110 flies with a positive pitch such that leading surface 226 flies at a greater distance from the surface of disc 107 than trailing surface 224. Transducer 210 is therefore typically positioned along trailing surface 224 such that the lower tip of the transducer is positioned near the closest point on slider 110 to the surface of disc 107. This position achieves the greatest resolution between magnetic domains on disc 107.

The operating performance of transducer 210 is based in part on the spacing 254 between the lower tip of the transducer and the surface of disc 107. Spacing 254 is referred to as the head-media spacing (HMS). The head-media spacing 254 is based on tangential velocity 250 of disc 107, the properties of suspension 112, the flying characteristics of slider 110 and the vertical position of the pole tip on slider 110. Two primary factors contribute to the vertical position of the pole tip. The first is pole tip recession 256 in which the vertical position of the pole tip becomes recessed (or protruded) relative to bearing surface 220 due to the machining and other fabrication processes of the slider and transducer structures. Manufacturing variations in pole tip recession 256 can contribute to undesirable variation in head-media spacing, which can limit recording density. The second is thermal pole tip protrusion (TPTP), which is caused by increases in the environmental temperature of the product and by heat generated by write current through the transducer during normal operation.

In one embodiment of the present invention, a structure is fabricated as part of the plurality of thin film layers 240 on the wafer level, which has material stresses that can be treated on a slider level so as to adjust the pole tip position. The pre-stressed structure can be an active element associated with operation of the transducer structure or an inactive element not associated with operation of the transducer structure.

FIG. 5 is a fragmentary, trailing end view of slider 110, which illustrates the addition of a pre-stressed structure 300 along trailing surface 224 according to one embodiment of the present invention. The material used for pre-stressed structure 300 and the optimization of the wafer-level processes are chosen such that structure 300 has a material stress following fabrication, which is large enough to allow for sufficient adjustment of the pole tip recession at the slide level.

In FIG. 5, pre-stressed structure 300 is shown as being rectangular for illustration purposes only. Structure 300 can have any shape that can be potentially advantageous to subsequent material stress treatment. In this embodiment, pre-stressed structure 300 is located on trailing surface 224, between transducer structure 210 and back surface 222. However, pre-stressed structure 300 can be positioned at other locations on trailing surface 224 in alternative embodiments of the present invention.

FIG. 6 is a cross-sectional view of slider 110 taken along lines 6—6 of FIG. 5 according to one embodiment of the present invention. Pre-stressed structure 300 is formed as one or more of the plurality of layers 240 that form transducer 210. In this example, transducer 210 is a thin film magnetic transducer having a coil 400, a core 402, an insulator 404, a pole tip 406, and an overcoat 408. Each of these elements can be fabricated in one or more of the plurality of thin film layers 240 through a series of deposition, etching, lift-off-processes at the wafer level, for example. In this example, pre-stressed structure 300 is formed beneath part of the outermost overcoat layer 408. In alternative embodiments, pre-stressed structure 300 can be formed in other relative positions, such in the outermost layer, a layer that is part of a transducer element, or a layer that is between two or more transducer elements. Other types of transducers can also be used, such as optical, magneto-optical, magneto-resistive, ferro-electric, etc. Also, transducer 210 can be configured for longitudinal or vertical recording.

The method of stress treatment can be any one that modifies the material stress in pre-stressed structure 300. One example of stress treatments, pre-stressed structure 300 is thermally relaxed to reduced compressive stress in the pre-stress structure. Other examples include any method of removing stressed material or machining the surface of structure 300 to modify the surface stress. Pre-stressed structure 300 can be thermally relaxed by laser heat treatment, for example. Laser heat treatment can be controlled to cause the material to shrink upon cooling. Therefore, an initial pole tip protrusion may be desired to achieve a final target pole tip recession following laser heat treatment. However, any thermal heat treatment can be used.

Thermal heat treatment operates through two mechanisms. The first mechanism is residual stress relaxation. During the wafer fabrication process, the transducer and pre-stressed structure are fabricated through the sequential application and processing of thin film layers. During the fabrication process, the layers experience various temperature changes, including cooling after the final layer has been applied. The material forming the different layers can have different thermal coefficients of expansion than one or more of the adjacent layers. Therefore, any given layer, including those that form the pre-stressed structure 300, can become constrained by surrounding materials due to the temperature changes following each fabrication step and the differing thermal coefficients of expansion. This results in a level of material stress after the wafer has been fabricated.

Later, when the material in pre-stressed structure 300 is thermally treated, such as with a laser, the material stress in structure 300 is relieved, resulting in deformation in one or more of the thin film layers 240 and movement of transducer structure 210. Arrow 310 represents vertical movement of transducer structure 210 relative to bearing surface 220 due to relaxation of residual material stress in pre-stressed structure 300.

The second mechanism is material re-solidification. When the laser beam scans over the material surface, the heating effect on the material can be localized at or close to the material surface. The heating effect can be so high that it can melt or even evaporate the material in the vicinity of the laser beam. For example, the temperature can be as high as 3000C at the beam center. After the laser beam is removed, the melted material re-solidifies, resulting in very high tensile stress in the local area. High intensity flux of the laser beam energy can result in high surface temperatures and steep temperature gradients in the treated material, which yields high cooling rates and in turn increases the magnitude of the residual tensile stresses in the material. For example, the resulting tensile stresses can be as high as 250 Mpa in some materials. The residual tensile stress can be controlled to effect further vertical movement of the pole tips.

FIG. 7 is a diagram of an apparatus 500 for adjusting the recession of the pole tip (or other active element) of a transducer toward a desired vertical position, according to one embodiment of the present invention. Apparatus 500 includes a recession measuring device 501, a thermal source 502, a processing device, such as programmed computer, 504 and scanner 506. Programmed computer 504 operates measuring device 501, thermal source 502, and scanner 506 according to a sequence of instructions stored in a memory (not shown), which is associated with the computer, and user commands provided by a user through a user interface (also not shown). Computer 504 can include a single device or multiple devices connected to the appropriate elements in apparatus 500.

During the recession adjustment process, each slider 110 is sequentially moved into a working position relative to beam 510 and measuring device 501. The sequence of instructions, when executed by computer 504, causes apparatus 500 to measure the pole tip recession 256 (shown in FIG. 3) with measuring device 501, select appropriate operating parameters for thermal source 502 and scanner 506, and then alter the material stresses in pre-stressed structure 300.

In one embodiment, measuring device 501 includes an optical interferometer. Other measuring devices can also be used. Thermal source 502 can include a laser, for example, which generates coherent light having continuous or pulsed power that is delivered to scanner 506 over a fiber-optic cable 508. Fiber-optic cable 508 is coupled to scanner 506 through a system of lenses 509, for example. Scanner 506 focuses the light beam on pre-stressed structure 300 through an objective lens. In one embodiment, scanner 506 includes a two-axis galvanometer with a set of mirrors that allow planar x–y motion of the focused beam 510 along the trailing surface of slider 110. Other optical elements can be used in alternative embodiments.

As beam 510 is scanned along pre-stressed structure 300, the laser beam melts the surface material along the scan line, which reduces preexisting compressive stresses along the scan line. When the molten material solidifies, new tensile stress is added to the surface material, depending on the operating parameters of the light beam. The resulting stress change causes deformation of one or more layers along trailing surface 224. Thus, thermal treatment on pre-stressed structure 300 can be used to cause a controlled change in the vertical position of the active elements of transducer 210 relative to bearing surface 220. The wavelength of beam 510 is preferably near the infrared region and provides for enough heating to melt the material without material removal. With a continuous wave laser beam, the tensile stress induced during cooling of the substrate material is aligned predominantly parallel to the scan direction. However, other light operating parameters can also be used to alter material stresses in or on structure 300 to effect a change in the vertical position of the transducer.

Several factors can be used to control or optimize the residual stress level. Laser characteristics such as the laser operating mode and the laser media can interact differently with different materials, resulting in different thermal stress-releasing behaviors and hence different amounts of pole tip adjustment. For example, the laser can be operated in the continuous wave mode or the pulsed mode, as mentioned above. Various laser media can be used such as a $CO_2$ laser, an Nd-YAG laser, or a Cu-Excimer laser, depending on the material used for pre-stressed structure 300.

The laser power and scanning speed can be optimized as desired. The laser power affects the amount of stress-release within the material. The scanning speed affects homogenization. The laser power can be set to melt and/or evaporate the material. The combination of the laser power level and the scanning speed can be an effective input for controlling the material response to the laser beam. Further, the pattern of laser scan lines on the material can affect the level and direction of material stress-release and the amount and direction of added tensile stress. For example, the number, location, density and orientation of the scan lines can be selected as desired.

The laser focus size can be used to control the Heat-Affected-Zone in the material. The surface roughness of the pre-stressed material and any surface coatings over the pre-stressed material can be used to change the reflectivity and the absorptivity of the laser beam energy. For example, a typical material that is used for overcoat layer 408 (shown in FIG. 5) is alumina ($Al_2O_3$), which is largely transparent to the laser beam. Other operating parameters can also be used for controlling the amount of pole tip adjustment.

A 1.0–1.5 KW $CO_2$ continuous wave laser has been reported in literature to create a tensile stress level as high as 250 MPa on the surface of an iron-based material, wherein the scanning speed was 15–21 mm/s, and a defocus of about 22 mm out of a 137 mm laser focus length. Current commercial laser machines can easily provide power levels between 1W to 10,000W. If a higher stress level is desirable, the power level can be further increased within the range of the laser.

FIG. 8 is a flow chart illustrating a sequence of steps for adjusting recession of a pole tip (or other active element) of a transducer according to one embodiment of the present invention. At step 701 an incoming slider is received for adjustment. The initial pole tip recession is measured by measuring device 501 (shown in FIG. 6) at step 702. Based on the measurement, computer 504 determines the laser adjustment parameters, at step 703, based on predetermined pole tip recession (FM) response transfer functions 713 and a pre-determined decision-making system. Some of the variables that can be controlled are discussed above, and can include laser power 710, the number of scan lines 711, and the scan velocity 712. At step 704, a first laser treatment is applied according to the parameters determined at step 703. A second pole tip recession measurement is made at step 705. If needed, a second set of process parameters can be determined at step 706 and a second, refined laser treatment can be performed at step 707. A final pole tip recession measurement is made at step 708. Any number of measurement and laser treatment cycles can be used in alternative embodiments of the present invention.

Computer modeling was conducted to test the transducer recession response due to laser heat treatment. FIG. 9 is a graph illustrating the deformed shapes along the bearing surface of slider 110 following a simulated laser heat treatment for various materials used for the pre-stressed structure 300. The x-axis represent location in microns (um) along the bearing surface, from the leading edge to the trailing edge, and the y-axis represents deformation in microinches (uin). A structural temperature loading condition was used as a way of simulating the residual compressive stress in pre-stressed structure 300 following fabrication at the wafer level. The assumed temperature change following fabrication at the wafer level was –100° C. for all tested materials. FIG. 10 is a chart illustrating normalized pole tip recession response due to the simulated laser heat treatment for the various materials shown in FIG. 9. The various materials are plotted along the x-axis. The y-axis represents the normalized pole tip recession change in microinches per megapascal (MPa).

Looking at FIGS. 8 and 9, aluminum and zirconium are among those materials yielding the largest response. The materials that have the greatest response to laser heat treatment are preferred. However, other factors such as compatibility with the transducer functionality and existing processes and opacity of the material (related to laser energy absorption), should also be considered when selecting the material to be used for the pre-stressed structure.

Based on the data shown in FIGS. 8 and 9, literature of laser treatment and finite element modeling results, it is expected that relaxation of 150 MPa compressive stress can yield up to 0.023 microinches in pole tip recession adjustment. An additional laser-induced tensile stress of 200 MPa can yield up to 0.031 microinches in pole tip recession adjustment, for a total adjustment of 0.054 microinches in one embodiment of the present invention. It is predicted that the pole tip recession adjustment can be as high as 0.078 microinches, for example, if higher compressive and tensile stress are achieved in the wafer fabrication processes and the laser heat treatment. The material testing data and modeling results predict that the maximum pole tip recession adjustment can be as high as two to three times the current pole tip recession standard deviation. With this amount of adjustment potential, the process described above is capable of fine-tuning pole tip recession on a slider-by-slider basis for greatly reducing variation from one slider to the next.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, material stresses can be altered in the pre-stressed structure based on a heating process, a mechanical process or a material removal process, for example, in alternative embodiments of the present invention. Also, the term "pole tip recession" is a generic term intended to refer to recession of any active element of a transducer, wherein the vertical position of the element has an effect on the read and/or write performance of the transducer. The element is not required to be a magnetic pole. The embodiments of the present invention can be applied to any surface on a substrate that carries a transducer. In addition, the present invention is not limited to data storage systems.

What is claimed is:

1. A slider comprising:
    a slider body having a bearing surface, a back surface, which is opposite to the bearing surface and an edge, which extends between the bearing surface and the back surface;
    a transducer structure formed in a plurality of thin film layers on the edge of the slider and having an element with a vertical position relative to the bearing surface; and
    a position adjustment structure formed as part of the plurality of thin film layers and comprising a material having a different thermal coefficient of expansion than an adjacent one of the plurality of thin film layers, which is in contact with the position adjustment structure, such that the material has a level of material stress, wherein the position adjustment structure has a material stress adjustment pattern that effects a predetermined change in the vertical position and comprises a material melt and re-solidification pattern.

2. The slider of claim 1 wherein the position adjustment structure is located along the edge, between the transducer structure and the back surface.

3. The slider of claim 1 wherein the position adjustment structure is formed as an outermost layer of the plurality of thin film layers.

4. The slider of claim 1 wherein the plurality of thin film layers comprises an outermost overcoat layer and wherein the position adjustment structure is located beneath the outermost layer.

5. The slider of claim 1 wherein the position adjustment structure is an active element associated with operation of the transducer structure.

6. The slider of claim 1 wherein the position adjustment structure is an inactive element not associated with operation of the transducer structure.

7. The slider of claim 1 wherein the level of material stress comprises a level of compressive stress in the material that is associated with the material stress adjustment pattern.

8. The slider of claim 1 wherein the material of the pre-stressed structure comprises tensile stress that is associated with the material stress adjustment pattern.

9. The slider of claim 1 wherein the material stress adjustment pattern is selected as a function of the vertical position of the element as measured prior to application of the stress adjustment pattern to the position adjustment structure.

10. An apparatus comprising:
    a body having a bearing surface, a back surface, which is opposite to the bearing surface and an edge, which extends between the bearing surface and the back surface;
    a transducer structure formed in a plurality of layers on the edge of the slider and having an element with a vertical position relative to the bearing surface; and
    a position adjustment structure formed as part of the plurality of layers and comprising a material stress adjustment pattern that is based on the vertical position of the element as measured prior to application of the stress adjustment pattern to the position adjustment structure to effect a predetermined change in the vertical position and comprises a material melt and re-solidification pattern.

11. The apparatus of claim 10 wherein the position adjustment structure is located along the edge, between the transducer structure and the back surface.

12. The apparatus of claim 10 wherein the position adjustment structure is formed as an outermost layer of the plurality of thin film layers.

13. The apparatus of claim 10 wherein the plurality of thin film layers comprises an outermost overcoat layer and wherein the position adjustment structure is located beneath the outermost layer.

14. The apparatus of claim 10 wherein the position adjustment structure is an active element associated with operation of the transducer structure.

15. The apparatus of claim 10 wherein the position adjustment structure is an inactive element not associated with operation of the transducer structure.

16. The apparatus of claim 10 wherein position adjustment structure comprises a material having a level of compressive stress that is associated with the material stress adjustment pattern.

17. The apparatus of claim 10 wherein position adjustment structure comprises a material having tensile stress that is associated with the material stress adjustment pattern.

18. An apparatus comprising:
    a body having a bearing surface;
    a transducer structure, which is supported by the body and has an element with a vertical position relative to the bearing surface; and
    a position adjustment structure, which is supported by the body and has a material stress adjustment pattern comprising a material melt and re-solidification pattern that effects a predetermined change to the vertical position.

19. The apparatus of claim 18 wherein the material stress adjustment pattern is a function of the vertical position of the element as measured prior to application of the stress adjustment pattern to the position adjustment structure.

* * * * *